United States Patent
Chien et al.

(10) Patent No.: US 6,763,702 B2
(45) Date of Patent: Jul. 20, 2004

(54) METHOD AND APPARATUS FOR HERMETICITY DETERMINATION AND LEAK DETECTION IN SEMICONDUCTOR PACKAGING

(75) Inventors: Allen Chien, San Ramon, CA (US); Frank S Geefay, Cupertino, CA (US); Cheol Hyun Han, Fremont, CA (US); Qing Gan, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/325,356

(22) Filed: Dec. 19, 2002

(65) Prior Publication Data

US 2004/0118187 A1 Jun. 24, 2004

(51) Int. Cl.⁷ .............................. G01M 3/16; G01M 3/20
(52) U.S. Cl. .......................................... 73/40.7; 73/49.3
(58) Field of Search .................................. 73/40.7, 49.3, 73/52

(56) References Cited

U.S. PATENT DOCUMENTS

| | | | | |
|---|---|---|---|---|
| 4,920,785 A | * | 5/1990 | Etess | 73/40.7 |
| 5,361,626 A | * | 11/1994 | Colligan et al. | 73/40.7 |
| 5,369,983 A | * | 12/1994 | Grenfell | 73/40.7 |
| 5,499,529 A | * | 3/1996 | Kronberg et al. | 73/40.7 |
| 5,633,454 A | * | 5/1997 | Abe et al. | 73/40.7 |
| 6,460,405 B1 | * | 10/2002 | Mayer et al. | 73/40.7 |

OTHER PUBLICATIONS

Joint Electron Device Engineering Council (JEDEC) Jul. 2001.

* cited by examiner

Primary Examiner—Daniel S. Larkin
(74) Attorney, Agent, or Firm—Judy Liao Shie

(57) ABSTRACT

A method and apparatus for determining the hermeticity of a semiconductor package is disclosed. Gas is introduced into the semiconductor package during packaging. Vacuum suction is then applied to the package. If the package has any leaks, the gas within will escape. The package is next scanned using a spectrometer. If the spectrometer does not detect any gas within the package cavity, the package is not hermetically sealed. In an alternate embodiment, the device is packaged first, and then immersed in a pressurized liquid. If the package has a leak, the pressure on the liquid will force liquid into the package cavity. The cavity of a properly sealed package will remain empty and dry. The package is scanned using a spectrometer. If the spectrometer detects liquid within the package, the package is not hermetically sealed.

16 Claims, 4 Drawing Sheets

METHOD AND APPARATUS FOR HERMETICITY DETERMINATION AND LEAK DETECTION IN SEMICONDUCTOR PACKAGING

FIELD OF THE INVENTION

The invention is directed towards semiconductor packaging and more specifically, towards determining the hermeticity of semiconductor packaging.

BACKGROUND OF THE INVENTION

Many semiconductor devices are sensitive to contamination, humidity, and other environmental factors. A package for such a device must be hermetically sealed to protect it from harm. The package is subsequently checked for leaks to ensure that it is properly sealed.

One existing method for detecting a leaky package is to place it in an environment pressurized with helium gas. If the package has a leak, helium will be pushed into the package cavity. Next, the package is removed to a chamber that is connected to a mass spectrometer. The chamber is vacuum-pumped, so any helium that found its way into the package cavity will be suctioned out. If the mass spectrometer detects helium, the package was not properly sealed. This method and others are described in more detail in the Joint Electron Device Engineering Council (JEDEC) standard for hermeticity, JESD22-A109-A, published July 2001.

The prior aft methods have a few drawbacks, however. After a leaky package is flooded with gas, some of the trapped gas inevitably leaks back out when the package is moved to the vacuum chamber. The package cavity must be large enough to allow for this leakage and still retain enough helium to be detected by the mass spectrometer. Additionally, only a single package can be tested at a time using the prior methods. When multiple packages are placed into the vacuum chamber, the prior methods cannot pinpoint which of the packages has a leak.

Current packaging processes have evolved to create much smaller package cavities than before. Wafer-level packaging is one such process. In wafer-level packaging, the semiconductor device is packaged while it remains on the wafer. The device is capped with a cap wafer, thus sandwiching the device between the two wafers and forming a package. Thousands of devices on a wafer can be packaged simultaneously in this fashion. Later, the devices are sawed apart or otherwise separated from each other.

These wafer-level packages are too small to be tested for hermeticity using the prior art methods. The amount of gas trapped within the wafer-level packages is so small that, after accounting for gas leakage, not enough gas remains behind in the package to obtain an accurate measurement. Furthermore, since the prior art methods can only test one package separately at a time, testing the thousands of wafer-level packages created per wafer would be a very time-consuming and expensive process.

SUMMARY OF THE INVENTION

In a preferred embodiment of the present invention, a method for determining the hermeticity of a semiconductor package is disclosed. This embodiment will hereinafter be referred to as the encapsulation method. First, the device is packaged in a chamber flooded with gas, trapping gas within the package cavity. Next, the package is subjected to a vacuum. If the package has a leak, the previously trapped gas will be sucked out. However, a properly sealed package will not be affected by the vacuum suction, and the gas will remain inside. Finally, the package is scanned using a spectrometer. If the spectrometer does not detect any gas, the package has a leak. If the spectrometer detects gas within the package cavity, then the package is hermetically sealed.

An alternate method for determining the hermeticity of a semiconductor device package is also disclosed. This method will hereinafter be referred to as the infiltration method. First, the device is packaged. Next, the package is immersed in a pressurized liquid. If the package has a leak, the pressure on the liquid will force liquid into the package cavity. However, the cavity of a properly sealed package will remain empty and dry. Finally, the package is scanned using a spectrometer. If the spectrometer detects liquid within the package, the package has a leak. If the spectrometer does not detect any liquid, then the package was properly sealed.

These methods can be successfully used on packages too small to be reliably tested before Furthermore, the packages do not have to be separated from each other before their hermeticity can be tested—the packages can remain on the wafer during hermeticity testing.

Further features and advantages of the present invention, as well as the structure and operation of preferred embodiments of the present invention, are described in detail below with reference to the accompanying exemplary drawings. In the drawings, like reference numbers indicate identical or functionally similar elements.

DETAILED DESCRIPTION

Generally, the prior art methods were no longer accurate when the package cavity was smaller than $1 \times 10^{-2}$ cm$^3$. In contrast, the methods taught by the present invention will work properly to determine hermeticity in package cavities smaller than $1 \times 10^{-2}$ cm$^3$. The methods described herein are equally valid for testing larger packages as well. In actual working embodiments, package cavities as small as $5 \times 10^{-5}$ cm$^3$ were accurately tested.

Figure 1:
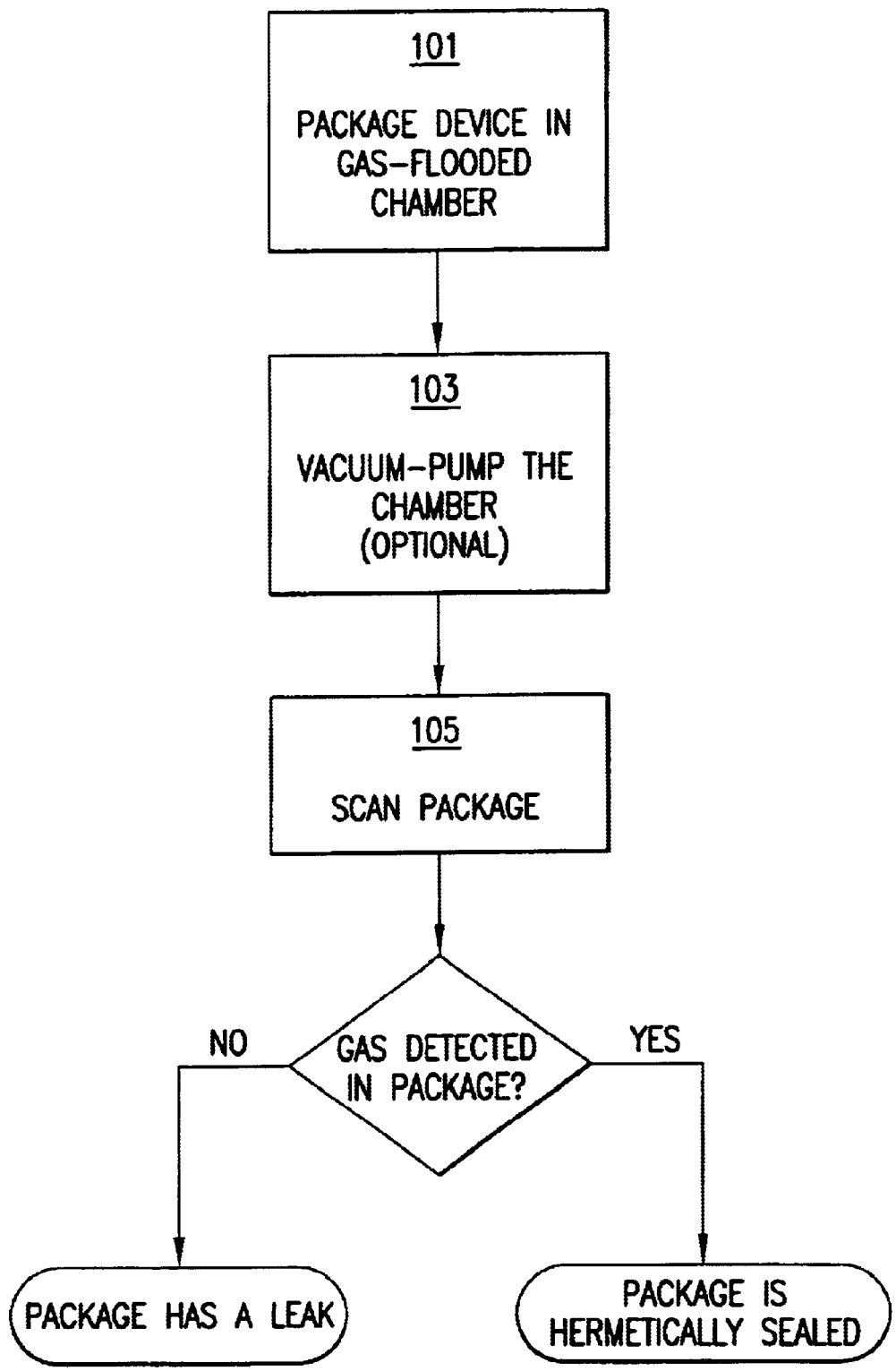
FIG. 1 shows a flowchart for the encapsulation method.

FIG. 1 shows a flowchart for the encapsulation method. First, in step 101, the device is packaged in a chamber flooded with gas. After packaging is completed, a pocket of gas will be trapped within the package cavity.

The gas used in step 101 should not react with the device being packaged. Furthermore, the gas must remain stable during packaging. The gas must also be detectable in step 105 (discussed below). In an actual working embodiment, the chamber was flooded with one atmosphere of sulfur hexafluoride ($SF_6$). Other possible choices for the gas include carbon dioxide ($CO_2$) and nitrous oxide ($NO_2$).

Next, in step 103, the package is subjected to a vacuum. The chamber is vacuum-pumped to remove, all the gas from the chamber. The gas in a leaky package will also be suctioned out during this process. The gas in a properly sealed package will not be affected by the vacuum suction, so the gas will remain within the package cavity. Step 103 is optional, as it only serves to speed up the flow of gas exiting a leaky package. Alternatively, the packages can be left to sit until the gas has seeped out of the leaky packages on its own.

Finally, in step 105, the package is scanned with a spectrometer. When the spectrometer detects gas within the package, the package is hermetically sealed. When no gas is detected, the package is leaky. Some care must be exercised here if $CO_2$ or $NO_2$ was used in step 101, as $CO_2$ and $NO_2$ are naturally found in the surrounding atmosphere and may lead to false negative readings.

The spectroscopic technique used by the spectrometer in step 105 must be capable of penetrating the package exterior to excite any gas molecules trapped within. When excited, the gas molecules emit a characteristic wavelength that is detectable by the spectrometer. Possible spectroscopic techniques that may be used include infrared, Raman, ultraviolet, and fluorescent spectroscopy.

Figure 2:
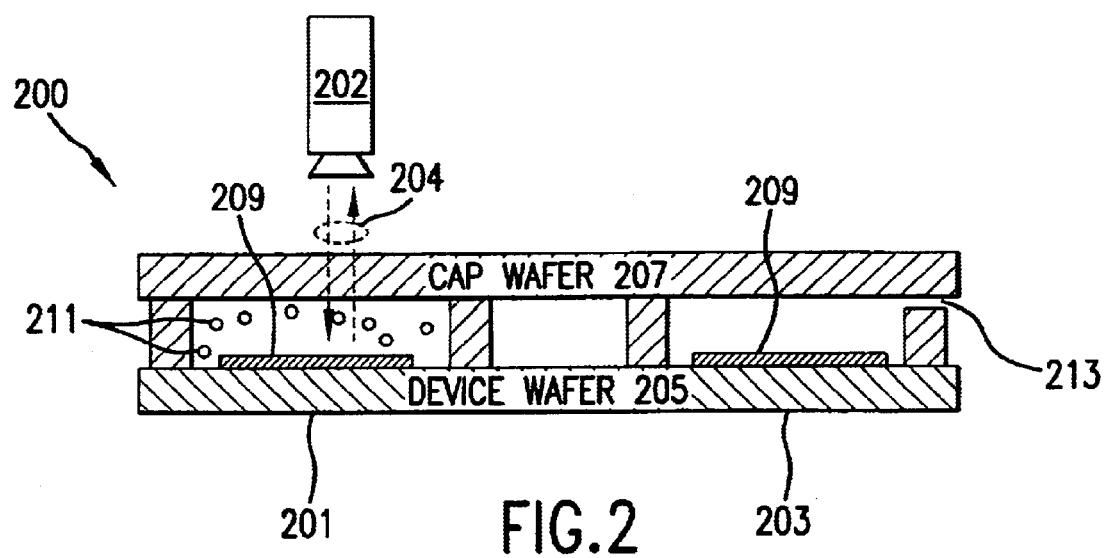
FIG. 2 is a cross-sectional view of a wafer-package array after undergoing the encapsulation method.
Figure 3:
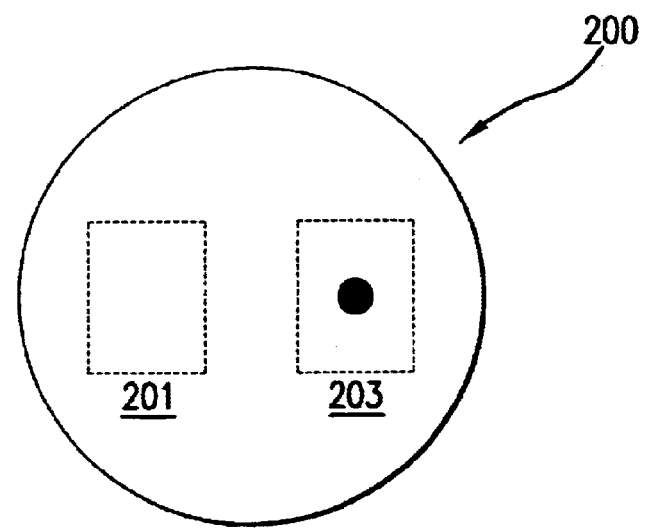
FIG. 3 shows a top view of the wafer-package array of FIG. 2.

FIG. 2 and FIG. 3 illustrate a wafer-package array formed by the encapsulation method. FIG. 2 is a cross-sectional view of a wafer-package array 200 having two wafer-level packages 201 and 203, each package protecting a device 209. The concepts illustrated by the simplified wafer-package array 200 are equally applicable to the larger, more complex wafer-package arrays built in actual production. The packages were created by bonding a device wafer 205 to a cap wafer 207 in a gas-flooded environment, as taught in step 101 of FIG. 1. The packages were then subjected to a vacuum (step 103). Package 201 is properly sealed, as evidenced by the gas molecules 211 still contained within the cavity. Package 203 has a leak 213, and its cavity is empty because all its gas was suctioned out during step 103.

Each package in the wafer-package array 200 is moved under a spectrometer 202 and checked for the presence of gas, until all the packages in the wafer-package array 200 have been scanned. In this manner, the packages can be tested while they remain on the wafers. In an actual working embodiment, infrared spectroscopy was used to scan the packages. Infrared light 204 is beamed towards package 201 to excite any gas that may be contained within. The floor of the package interior may be plated with gold, silver, copper, or any other reflective material to reflect the infrared light 204 back towards the spectrometer 202. The spectrometer reads the wavelengths of the reflected light to determine whether gas was detected within. Alternatively, if the package floor is not plated, the spectrometer must be able to detect the infrared light that is transmitted through to the opposite side of the package.

When the spectrometer 202 finds a leaky package, the package is marked as defective so that it can later be discarded. FIG. 3 shows a top view of the wafer-package array 200, after it has been scanned. Since gas remains in package 201, package 201 was properly sealed and is not marked. Package 203 contained no gas, however, so it is marked with an ink dot. This process of scanning and marking can be easily automated.

Figure 4:
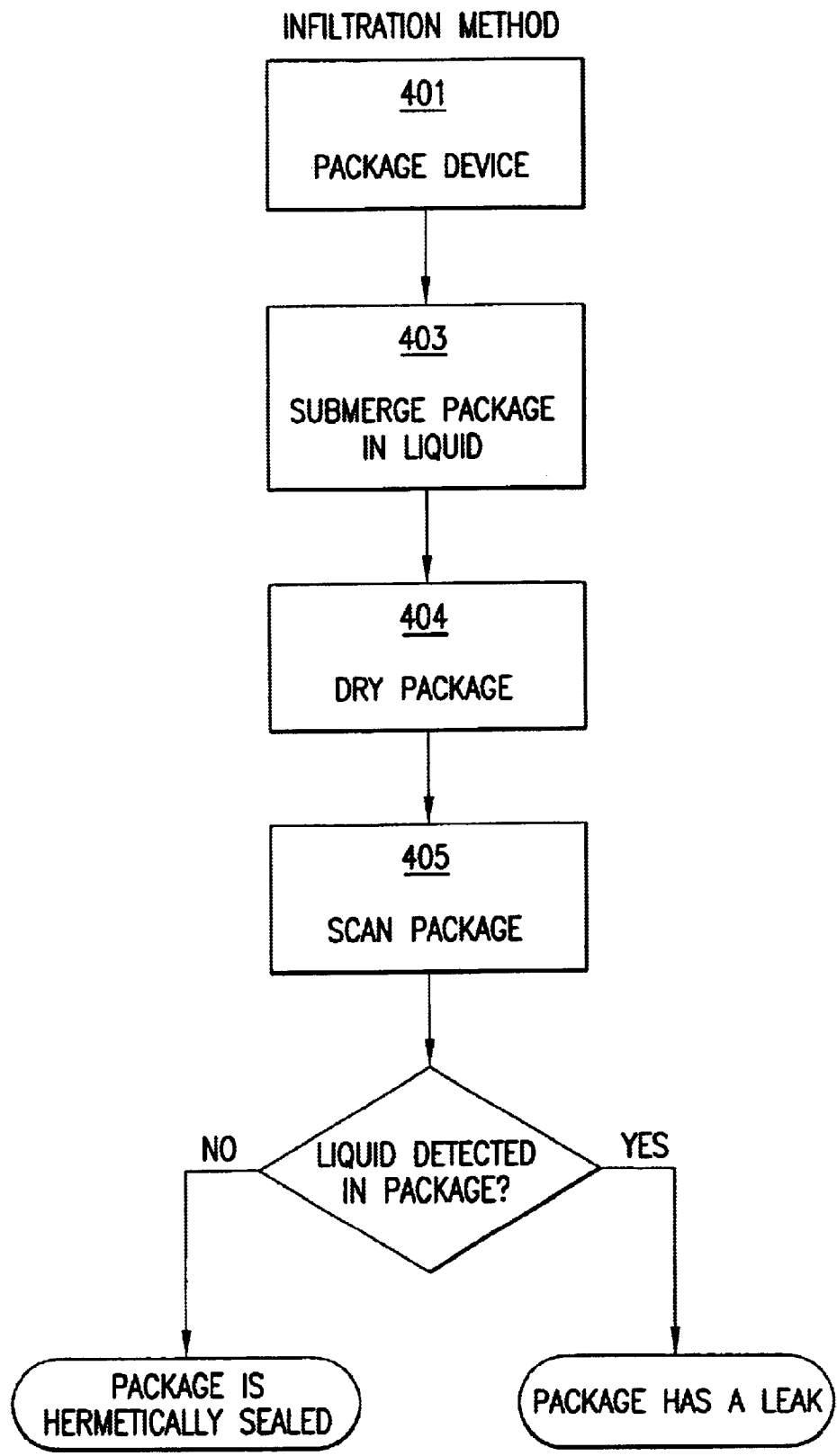
FIG. 4 shows a flowchart for the infiltration method.

FIG. 4 shows a flowchart for the infiltration method. First, in step 401, the device is packaged. Next, in step 403, the package is immersed in a pressurized liquid. The pressure on the liquid should be sufficient to force liquid through any leaks in the package. When the package is properly sealed, the package cavity will remain dry. When the package has a leak, liquid will be pushed through the leak into the package cavity.

The liquid used should be inert, and not found abundantly in the atmosphere. Liquids with smaller molecules are preferred, because it is easier for small molecules to seep through a leak. The liquid must be detectable in step 405 (discussed below). In an actual working embodiment, liquid isopropanol was used under 90–100 PSI of pressure. Other possible choices for the liquid include methanol, other alcohols, and chloro-fluoro-carbons (CFCs).

The package is dried off in step 404. Finally, in step 405, the package is scanned with a spectrometer. When the spectrometer does not detect liquid within the package, the package is hermetically sealed. When liquid is detected, the package is leaky. A possible alternative to scanning the package with a spectrometer is weighing the package. A leaky package containing liquid within its cavity will weigh more than a hermetically sealed package with an empty cavity.

As with the encapsulation method, the spectroscopic technique used by the spectrometer in step 405 should be capable of penetrating the package exterior to excite the liquid molecules trapped within. In an actual working embodiment, infrared spectroscopy was used to scan the packages processed using the infiltration method. Other possible spectroscopic methods include Raman, ultraviolet, and fluorescent spectroscopy.

Figure 5:
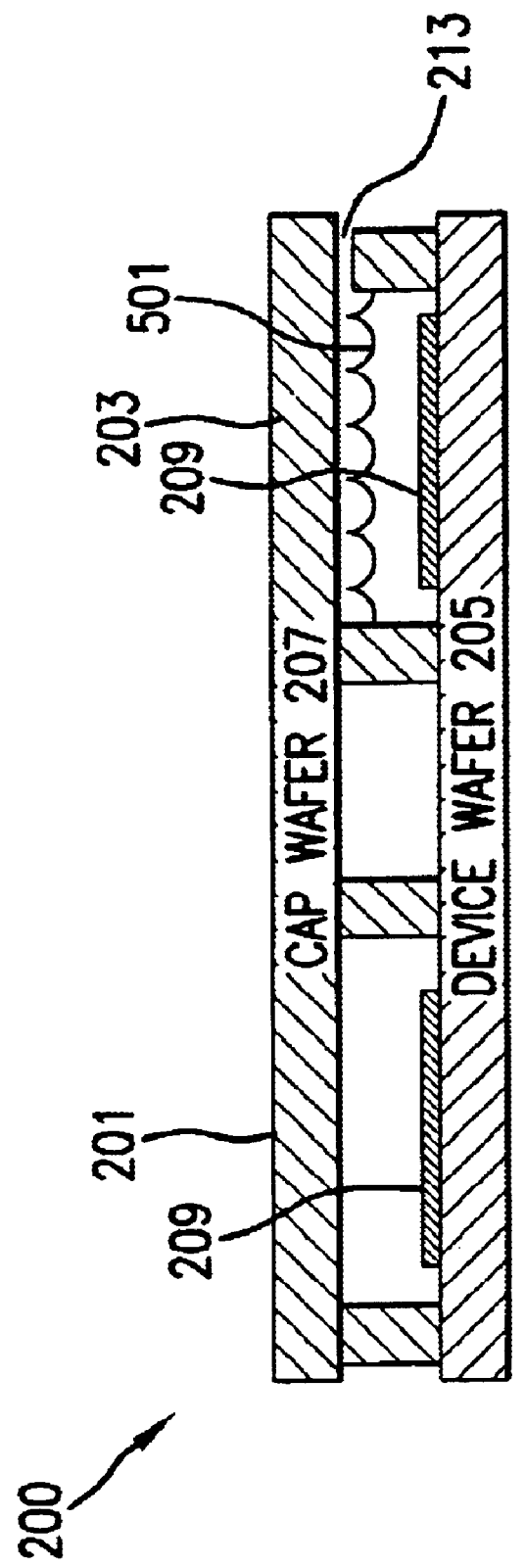
FIG. 5 shows a cross-sectional view of the wafer-package array after undergoing the infiltration method.

FIG. 5 shows a cross-sectional view of the wafer-package array 200 having two wafer-level packages 201 and 203, formed by the infiltration method. Package 201 was properly sealed, as evidenced by its dry and empty cavity. Package 203 has a leak 213, and its cavity is filled with liquid 501 due to the immersion in step 403. The packages can be scanned for leaky packages and marked as described for the encapsulation method, except that the presence of liquid 501 rather than the absence of gas indicates a lo package.

Although the present invention has been described in detail with reference to particular preferred embodiments, persons possessing ordinary skill in the art to which this invention pertains will appreciate that various modifications and enhancements may be made without departing from the spirit and scope of the claims that follow.

We claim:

1. A method of determining the hermeticity of a semiconductor package, comprising:

tapping gas in the package cavity during packaging; and spectroscopically checking for gas within the package cavity, wherein the presence of gas indicates the package is hermetically sealed, and the absence of gas indicates the package has a leak.

2. The method as in claim 1, further comprising:

subjecting the package to a vacuum, prior to checking for gas.

3. The method as in claim 1, wherein the package cavity has a volume less than $1 \times 10^{-2}$ cm$^3$.

4. The method as in claim 1, wherein spectroscopically checking includes a spectroscopic technique selected from the group consisting of infrared, Raman, ultraviolet, and fluorescent spectroscopy.

5. The method as in claim 1, wherein the gas is selected from the group consisting of sulfur hexafluoride (SF6), carbon dioxide ($CO_2$), and nitrous oxide ($NO_2$).

6. The method as in claim 1, wherein the package floor is plated with a reflective material.

7. The method as in claims 6, wherein the reflective material is selected from the group consisting of gold, silver, and copper.

8. A method for determining the hermeticity of a semiconductor device package, comprising:

immersing the package in a pressurized liquid, wherein the pressure on the liquid is sufficient to force liquid through any leaks in the package; and spectroscopically checking for liquid within the package cavity, wherein the absence of liquid indicates the package is hermetically sealed, and the presence of liquid indicates the package has a leak.

9. The method as in claim 8, wherein the package cavity has a volume less than $1 \times 10^{-2} cm^3$.

10. The method as in claim 8, wherein spectroscopically checking includes a spectroscopic technique selected from the group consisting of infrared, Raman, ultraviolet, and fluorescent spectroscopy.

11. The method as in claim 8, wherein the liquid is selected from the group consisting of isopropanol, methanol, alcohol, and chloro-fluoro-carbons (CFCs).

12. The method as in claim 8, wherein the package floor is plated with a reflective material.

13. The method as in claim 12, wherein the reflective material is selected from the group consisting of gold, silver, and copper.

14. A semiconductor device package, prepared by a process comprising:

trapping gas in the package cavity during packaging; and spectroscopically checking for gas within the package cavity, wherein the presence of gas indicates the package is hermetically sealed, and the absence of gas indicates the package has a leak.

15. The semiconductor device package as in claim 14, wherein the package cavity has a volume less than $1 \times 10^{-2} cm^3$.

16. The semiconductor device package as in claim 14, wherein the gas is selected from the group consisting of sulfur hexafluoride (SF6), carbon dioxide ($CO_2$), and nitrous oxide ($NO_2$).

* * * * *